(12) United States Patent
Cometto et al.

(10) Patent No.: US 7,830,809 B2
(45) Date of Patent: *Nov. 9, 2010

(54) METHODS AND APPARATUS FOR CHARACTERIZING A ROUTE IN A FIBRE CHANNEL FABRIC

(75) Inventors: Maurilio Cometto, San Jose, CA (US); Thomas James Edsall, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 921 days.

This patent is subject to a terminal disclaimer.

(21) Appl. No.: 11/713,341

(22) Filed: Mar. 2, 2007

(65) Prior Publication Data

US 2007/0153816 A1    Jul. 5, 2007

Related U.S. Application Data (63) Continuation of application No. 10/170,855, filed on Jun. 12, 2002, now Pat. No. 7,206,288.

(51) Int. Cl.
*H04L 12/26* (2006.01)

(52) U.S. Cl. .................................. 370/249; 370/252

(58) Field of Classification Search ............... None
See application file for complete search history.

(56) References Cited

U.S. PATENT DOCUMENTS

| | | | |
|---|---|---|---|
| 5,428,471 A | 6/1995 | McDermott | |
| 5,506,838 A | 4/1996 | Flanagan | 370/54 |
| 5,617,421 A | 4/1997 | Chin et al. | |
| 5,675,741 A | 10/1997 | Aggarwal et al. | 395/200.12 |
| 5,682,479 A | 10/1997 | Newhall et al. | |
| 5,708,659 A | 1/1998 | Rostoker et al. | |
| 5,740,159 A * | 4/1998 | Ahmad et al. | 370/249 |
| 5,740,171 A | 4/1998 | Mazzola et al. | |
| 5,742,604 A | 4/1998 | Edsall et al. | |
| 5,764,636 A | 6/1998 | Edsall | |
| 5,793,976 A * | 8/1998 | Chen et al. | 370/252 |
| 5,809,285 A | 9/1998 | Hilland | |
| 5,818,603 A | 10/1998 | Motoyama | |

(Continued)

FOREIGN PATENT DOCUMENTS

EP    0772121 A    5/1997

(Continued)

OTHER PUBLICATIONS

U.S. Appl. No. 10/114,568, filed Apr. 1, 2002, Cometto et al.

(Continued)

*Primary Examiner*—Steven H Nguyen
(74) *Attorney, Agent, or Firm*—Weaver Austin Villeneuve & Sampson LLP (57) ABSTRACT

A fibre channel frame is received at a first fibre channel switch. The fibre channel frame includes time stamp information associated with fibre channel switches between a second fibre channel switch and the first fibre channel switch. A time-to-live (TTL) value included in the fibre channel frame is determined. The fibre channel frame is sent back to the second fibre channel switch upon determining the TTL value included in the fibre channel frame.

20 Claims, 8 Drawing Sheets

U.S. PATENT DOCUMENTS

| | | |
|---|---|---|
| 5,819,112 A | 10/1998 | Kusters |
| 5,862,125 A | 1/1999 | Russ |
| 5,959,972 A | 9/1999 | Hamami |
| 5,959,990 A | 9/1999 | Frantz et al. |
| 5,964,841 A | 10/1999 | Rekhter |
| 5,999,930 A | 12/1999 | Wolff |
| 6,035,105 A | 3/2000 | McCloghrie et al. |
| 6,046,985 A | 4/2000 | Aldred |
| 6,101,497 A | 8/2000 | Ofek |
| 6,160,813 A | 12/2000 | Banks et al. |
| 6,188,668 B1 | 2/2001 | Brewer et al. |
| 6,188,694 B1 | 2/2001 | Fine et al. |
| 6,202,135 B1 | 3/2001 | Kedem et al. |
| 6,205,488 B1 | 3/2001 | Casey et al. |
| 6,208,623 B1 | 3/2001 | Rochberger et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,226,771 B1 | 5/2001 | Hilla et al. |
| 6,243,358 B1 | 6/2001 | Monin |
| 6,260,120 B1 | 7/2001 | Blumenau et al. |
| 6,262,977 B1 | 7/2001 | Seaman et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,296 B1 | 9/2001 | Tappan |
| 6,295,575 B1 | 9/2001 | Blumenau et al. |
| 6,330,614 B1 | 12/2001 | Aggarwal et al. |
| 6,337,861 B1 | 1/2002 | Rosen |
| 7,406,034 B1 | 4/2002 | Cometto et al. |
| 6,388,995 B1 | 5/2002 | Gai et al. |
| 6,408,001 B1 | 6/2002 | Chuah et al. |
| 6,426,952 B1 | 7/2002 | Francis et al. |
| 6,438,612 B1 | 8/2002 | Ylonen et al. |
| 6,473,421 B1 | 10/2002 | Tappan |
| 6,493,349 B1 | 12/2002 | Casey |
| 6,529,963 B1 | 3/2003 | Fredin et al. |
| 6,532,212 B1 | 3/2003 | Soloway et al. |
| 6,597,663 B1 | 7/2003 | Rekhter |
| 6,604,407 B2 | 8/2003 | Kano |
| 6,643,287 B1 | 11/2003 | Callon et al. |
| 6,661,773 B1 | 12/2003 | Pelissier et al. |
| 6,674,760 B1 | 1/2004 | Walrand et al. |
| 6,728,220 B2 | 4/2004 | Behzadi |
| 6,728,848 B2 | 4/2004 | Tamura et al. |
| 6,766,482 B1 | 7/2004 | Yip et al. |
| 6,775,230 B1 | 8/2004 | Watanabe et al. |
| 6,804,776 B1 | 10/2004 | Lothberg et al. |
| 6,848,007 B1 | 1/2005 | Reynolds et al. |
| 6,859,435 B1 | 2/2005 | Lee et al. |
| 6,879,560 B1 | 4/2005 | Cahn |
| 6,904,053 B1 | 6/2005 | Berman |
| 6,915,358 B2 | 7/2005 | Horton et al. |
| 6,920,133 B1 * | 7/2005 | Boodaghians ............... 370/401 |
| 6,920,153 B2 | 7/2005 | Ellis et al. |
| 6,920,154 B1 | 7/2005 | Achler |
| 6,947,379 B1 | 9/2005 | Gleichauf et al. |
| 6,959,151 B1 | 10/2005 | Cotter et al. |
| 6,975,589 B2 | 12/2005 | Luft et al. |
| 6,985,490 B2 | 1/2006 | Czeiger et al. |
| 7,006,525 B1 | 2/2006 | Jha |
| 7,026,288 B2 | 4/2006 | Judice et al. |
| 7,027,406 B1 | 4/2006 | Shabtay et al. |
| 7,046,679 B2 | 5/2006 | Sampath |
| 7,050,392 B2 | 5/2006 | Valdevit |
| 7,054,304 B2 | 5/2006 | Wang |
| 7,061,858 B1 | 6/2006 | Di Benedetto et al. |
| 7,072,298 B2 | 7/2006 | Paul et al. |
| 7,076,594 B2 | 7/2006 | Benedetto et al. |
| 7,079,544 B2 | 7/2006 | Wakayama et al. |
| 7,082,140 B1 | 7/2006 | Hass |
| 7,085,846 B2 | 8/2006 | Jenne et al. |
| 7,155,494 B2 | 12/2006 | Czeiger et al. |
| 7,161,935 B2 | 1/2007 | Alonso et al. |
| 7,206,288 B2 * | 4/2007 | Cometto et al. ............. 370/249 |
| 7,216,158 B2 | 5/2007 | Revanuru et al. |
| 7,221,652 B1 | 5/2007 | Singh et al. |
| 7,275,103 B1 | 9/2007 | Thrasher et al. |
| 7,301,898 B1 | 11/2007 | Martin et al. |
| 7,302,494 B2 | 11/2007 | Hayashi et al. |
| 7,319,669 B1 | 1/2008 | Kunz et al. |
| 7,328,260 B1 | 2/2008 | Muthiyan et al. |
| 7,330,892 B2 | 2/2008 | Ibrahim |
| 7,355,983 B2 | 4/2008 | Scudder et al. |
| 7,366,194 B2 | 4/2008 | Yu et al. |
| 7,376,755 B2 | 5/2008 | Pandya |
| 7,433,326 B2 | 10/2008 | Desai et al. |
| 7,443,799 B2 | 10/2008 | Varanasi et al. |
| 7,447,224 B2 | 11/2008 | Dropps |
| 7,593,324 B2 | 9/2009 | Jain et al. |
| 7,599,360 B2 | 10/2009 | Edsall et al. |
| 7,616,637 B1 * | 11/2009 | Lee et al. ..................... 370/401 |
| 7,649,844 B2 | 1/2010 | Bector et al. |
| 2001/0020254 A1 | 9/2001 | Blumenau et al. |
| 2001/0049739 A1 | 12/2001 | Wakayama et al. |
| 2002/0009081 A1 | 1/2002 | Sampath et al. ............. 370/389 |
| 2002/0034178 A1 | 3/2002 | Schmidt et al. |
| 2002/0075873 A1 | 6/2002 | Lindhorst-Ko et al. |
| 2002/0085493 A1 | 7/2002 | Pekkala et al. |
| 2002/0101868 A1 | 8/2002 | Clear et al. |
| 2002/0110125 A1 | 8/2002 | Banks et al. |
| 2002/0133740 A1 | 9/2002 | Oldfield et al. |
| 2002/0150039 A1 | 10/2002 | Valdevit et al. |
| 2002/0152338 A1 | 10/2002 | Elliott et al. |
| 2002/0156918 A1 | 10/2002 | Valdevit et al. |
| 2002/0156924 A1 | 10/2002 | Czeiger et al. |
| 2002/0176434 A1 | 11/2002 | Yu et al. |
| 2002/0188754 A1 | 12/2002 | Foster et al. |
| 2003/0012204 A1 | 1/2003 | Czeiger et al. |
| 2003/0016624 A1 | 1/2003 | Bare |
| 2003/0067925 A1 | 4/2003 | Choe et al. |
| 2003/0101239 A1 | 5/2003 | Ishizaki |
| 2003/0107987 A1 | 6/2003 | Kinstler |
| 2003/0118053 A1 * | 6/2003 | Edsall et al. ................. 370/474 |
| 2003/0145116 A1 | 7/2003 | Moroney et al. |
| 2003/0149848 A1 | 8/2003 | Ibrahim et al. |
| 2003/0163727 A1 | 8/2003 | Hammons et al. |
| 2003/0189929 A1 | 10/2003 | Matsuzaki et al. |
| 2003/0198247 A1 | 10/2003 | Gardner et al. |
| 2004/0028060 A1 | 2/2004 | Kang |
| 2004/0100910 A1 | 5/2004 | Desai et al. |
| 2004/0151174 A1 | 8/2004 | Del Signore et al. |
| 2004/0151188 A1 | 8/2004 | Maveli et al. |
| 2004/0230787 A1 | 11/2004 | Blumenau et al. |
| 2004/0233921 A1 | 11/2004 | Krieg et al. |
| 2005/0018606 A1 | 1/2005 | Dropps |
| 2005/0018663 A1 | 1/2005 | Dropps |
| 2005/0018701 A1 | 1/2005 | Dropps |
| 2005/0036499 A1 | 2/2005 | Dutt et al. |
| 2005/0080903 A1 | 4/2005 | Valenci |
| 2005/0088969 A1 | 4/2005 | Carlsen et al. |
| 2005/0108444 A1 | 5/2005 | Flauaus |
| 2005/0117562 A1 * | 6/2005 | Wrenn ....................... 370/351 |
| 2005/0177634 A1 | 8/2005 | Scudder et al. |
| 2005/0249123 A1 | 11/2005 | Finn |
| 2005/0267965 A1 | 12/2005 | Heller |
| 2006/0034302 A1 | 2/2006 | Peterson |
| 2006/0087963 A1 | 4/2006 | Jain et al. |
| 2006/0092932 A1 | 5/2006 | Ghosh et al. |
| 2006/0117212 A1 | 6/2006 | Meyer et al. |
| 2006/0153186 A1 | 7/2006 | Bector |
| 2006/0159081 A1 | 7/2006 | Dropps |
| 2007/0153816 A1 | 7/2007 | Cometto et al. |
| 2008/0028096 A1 | 1/2008 | Henderson et al. |

| | | |
|---|---|---|
| 2008/0316942 | A1 | 12/2008 Desai et al. |
| 2009/0141657 | A1 | 6/2009 Dutt et al. |
| 2010/0008375 | A1 | 1/2010 Campbell et al. |

FOREIGN PATENT DOCUMENTS

| | | |
|---|---|---|
| EP | 1134938 | 9/2001 |
| EP | 1187406 | 3/2002 |
| JP | 2-209044 | 8/1990 |
| JP | 08/111693 | 4/1996 |
| JP | 10-293633 | 11/1998 |
| JP | 2000-22699 | 2/2000 |
| JP | 2001-154929 | 6/2001 |
| JP | 2001-320420 | 11/2001 |
| JP | 2001-345865 | 12/2001 |
| KR | 2001-0083215 | 1/2001 |
| WO | 00/31925 | 6/2000 |
| WO | WO01/19027 | 3/2001 |
| WO | 01/95565 | 12/2001 |
| WO | WO02/071224 | 12/2002 |

OTHER PUBLICATIONS

Office Action dated Aug. 18, 2009 for U.S. Appl. No. 12/202,004.
Allowed claims for U.S. Appl. No. 10/609,442.
US Office Action dated Jul. 10, 2009 in U.S. Appl. No. 10/979,886.
Notice of Allowance mailed Nov. 9, 2009 in U.S. Appl. No. 11/027,252.
Notification of Transmittal of International Preliminary Examination Report dated Aug. 7, 2003 issued to PCT/US02/41072.
KR Notification of Provisional Rejection dated Nov. 18, 2009 issued for KR Patent Application No. 2004-7015587 as stated in the letter from Kim and Cho dated Sep. 29, 2009.
KR Notification of Provisional Rejection dated Oct. 22, 2009 issued for KR Patent Application No. 2004-7015583 as stated in the letter from Kim and Cho dated Oct. 28, 2009.
Second CN Office Action dated Oct. 16, 2009 from China Patent Application No. 03813264.8.
Third Office Action issued on Nov. 20, 2009 for Chinese Patent Application No. 200380104466.6.
PCT Written Opinion dated Oct. 27, 2004 from corresponding PCT Application No. PCT/US2004/020518.
International Preliminary Report on Patentability dated Jan. 12, 2006 from corresponding PCT Application No. PCT/US2004/020518.
International Preliminary Report on Patentability dated May 10, 2007 from corresponding PCT Application No. PCT/US2005/037763.
D. Mills, Network Working Group Request for Comments 1059, *Network Time Protocol (Version 1) Specification and Implementation*, University of Delaware, Jul. 1988, p. 1-50.
Edsall et al., *Methods and Apparatus for Encapsulating a Frame for Transmission in a Storage Area Network*, filed Dec. 26, 2001, U.S. Appl. No. 10/034,160.
Search Results from EP Application No. 03 739 127.3-2416, mailed Apr. 5, 2006.
International Search Report mailed Nov. 4, 2003; PCT/US03/18765. 3 sheets.
Canadian Office Action, Application No. #2,487,071, mailed Jun. 15, 2006.
USPTO Notice of Allowance U.S. Appl. No. 10/609,442, mailed Sep. 26, 2008.
U.S. Appl. No. 10/974,368, Office Action dated Sep. 12, 2008.
U.S. Appl. No. 11/027,252, Final Office Action mailed Aug. 7, 2008.
U.S. Appl. No. 11/027,252, Office Action mailed Dec. 12, 2008.
Japanese Application No. 2003-582973, Office Action dated Dec. 22, 2008.
Canadian Office Action dated Aug. 13, 2008 from related CA Application No. 2,472,056, 2 pgs.
Office Action issued on Sep. 5, 2008 for CN Patent Application No. 200380104466.6.
U.S. Office Action dated Nov. 19, 2008 from U.S. Appl. No. 10/034,160.
Office Action issued on Dec. 26, 2008 for CN Patent Application No. 03807560.1.
U.S. Office Action dated Nov. 25, 2008 from U.S. Appl. No. 10/979,886.
Office Action issued on Aug. 13, 2008 for Canadian Patent Application No. 2,480,462.
Office Action issued on Jun. 22, 2007 for Chinese Patent Application No. 03813264.8.
US Appl. No. 10/974,368, Notice of Allowance dated Feb. 13, 2009.
Dutt, Dinesh G., et al. "Fibre Channel Switch that Enables End Devices in Different Fabrics to Communicate With One Another While Retaining Their Unique Fibre Channel Domain_IDS," U.S. Appl. No. 12/343,843, dated Dec. 24, 2008.
Canadian Office Action issued on Jan. 30, 2008 for Patent Application No. 2,480,461.
Chinese Office Action for Patent Application No. 200480010826.0, dated Nov. 7, 2008.
Office Action for CA Patent Application No. 2,521,463 dated Sep. 24, 2008.
Office Action for AU Patent Application No. 20043000650, dated Sep. 26, 2008.
Office Action mailed for U.S. Appl. No. 10/114,394, Mar. 23, 2009.
Notification of Provisional Rejection for KR Patent Application No. 2004-7010143 dated Apr. 15, 2009.
Australian Office Action, Application No. 2003245492, mailed Oct. 4, 2007.
Chinese First Office Action, Application No. 03813264.8, mailed Jun. 22, 2007.
Second Office Action issued on Apr. 28, 2009 for Canadian Patent Application No. 2,472,056.
Second Office Action issued on Apr. 24, 2009 for Chinese Patent Application No. 200380104466.6.
Chinese Office Action, Chinese Patent Application No. 03807600.4, Issued May 8, 2009.
Notice of Allowance dated Apr. 21, 2009 from U.S. Appl. No. 10/974,368.
Allowed Claims for U.S. Appl. No. 10/974,368.
Notice of Allowance dated May 29, 2009 from U.S. Appl. No. 10/034,160.
Allowed Claims for U.S. Appl. No. 10/034,160.
Notice of Allowance dated Jun. 25, 2009 from U.S. Appl. No. 10/114,394.
Allowed Claims for U.S. Appl. No. 10/114,394.
Notice of Allowance dated Jun. 26, 2009 from U.S. Appl. No. 11/027,252.
Allowed Claims for U.S. Appl. No. 11/027,252.
Japanese Office Action issued on May 25, 2009 for Patent Application No. 2003-582964.
"Fibre Channel Switch Fabric-3 (FC-SW-3)", NCITS working draft, Feb. 19, 2003. XP002300830 (A,B,C).
Guan et al., Inter-fabric FC Architecture, May 30, 2003, Brocade—The Intelligent Platform for Network Storage.
"Fibre Channel Switch Fabric-2 (FC-SW-2)", NCITS working draft, Jun. 26, 2001.
Fibre Channel Generic Services-3 (FC-GS-3), NCITS working draft, Nov. 28, 2000.
K. White, IBM Corp, RFC 2925, Sep. 2000.
Armitage, Grenville, "MPLS: The Magic Behind the Myths," Jan. 2000, IEEE Communications Magazine, pp. 124-131. XP000908346.
Listanti et al., "Architectural and Technological Issues for Future Optical Internet Networks", Optical Solutions for Next-Generation Internet Networks, IEEE Communication Magazine, Sep. 2000.
Cisco Systems, "Cisco SAN-OS Reference Guide", 1992-2004 Cisco Systems, Inc. pp. 1-13.
Cisco Systems, "Cisco SAN-OS", 1992-2003 Cisco Systems, Inc. pp. 1-7.
Cisco Systems, "Cisco MDS 9000 Family of Multilayer Directors and Fabric Switches", 1992-2003 Cisco Systems, Inc., pp. 1-4.
Ezio Valdevit, http://t11.org/index.htm, "Fabric Shortest Path First Version (FSPF) Rv. 0.2", Fabric shortest Path, May 23, 2000 XP002959525.
http://t11/org/index.htm, Fabric Shortest Path First (FSPF) Project 1508-D Switch Fabric -3 Rev. 6.5, Oct. 31, 2003, pp. 117-140.

DeSanti et al., "Tagged Frame Specification," Tagged Frame Spec., T11/03-353v0, May 2003, 4 pages.
Claudio DeSanti, "Virtual Fabrics", T11/03-220v0, PowerPoint presentation, Apr. 2003, 11 pages.
Claudio DeSanti, "Virtual Fabrics N_Port Support", VF N_Support, T11/04-49v0, Jul. 2004, 13 pages.
Claudio DeSanti, "Extended_Headers", VF N_Port Model, T11/04-627v1, Oct. 2004, 1 page.
Claudio DeSanti, "Virtual Fabrics Switch Support", VF Switch Support, T11/04-395v3, Oct. 2004, 15 pages.
Claudio DeSanti, "Virtual Fabrics N_Port Support", VF N_Support, T11/04-494v2, Oct. 2004, 14 pages.
Brocade Communication Systems, Inc. "Increasing Intelligence with the SAN Fabric", White paper, Online!, Jun. 2001 XP002251362.
Brocade Communication Systems, Inc. "Optimizing the performance and management of 2Gbit/sec SAN fabrics with ISL trunking", White paper, Online!, Mar. 2002.
Rosen et al., "Multiprotocol Label Switching Architecture", Network working group, RFC 3031, Jan. 2001 XP002251364.
Molero et al., "On the effect of link failure in fibre channel sotrage area networks", Parallel Architectures, Algorithms and Networks 2000, I-Span 2000 Proceedings, Int'l Symposium, Dec. 7-9, 2000.
VenKat Rangan: "Re: FCIP/1FCP: Gurantee In-Order delivery for FC N/NL_ports", IP Storage—Mailing List Archive, Online! http://www.pdl.cmu/edu/mailinglists/ips/mail/msg03069.html Sep. 4, 2001.
D. Mills, Network Working Group Request for Comments 1059, Network Time Protocol (Version 1) Specifiction and Implementation, University of Delaware, Jul. 1988, pp. 1-50.
M. Rajagopal, R. et al., "IP and ARP Over Fibre Channel" Request for Comments: 2625, 'Online!, Jun. 30, 1999, XP002246207.
Charles Monia: "iFCP- A Protocol for Internet Fibre Channel Storage Networking" Nishan Systems, 'Online!, Dec. 12, 2000, XP002246205.
Mearian et al., "What's After Fibre Channel?", Computerworld, Online!, Oct. 15, 2001, XP002246206.
Monia et al., "iFCP—A Protocol for Internet Fibre Channel Storage Networking" Feb. 2002.
ATM Forum Committee, Chapter 10, "Flush Message Protocol Procedures and Frame Formats," Lan Emulation Over ATM Version 2—LUNI Specification, AF-Lane-0084.000, Jul. 1997, pp. 111-115.
White Paper, Link Aggregation According to IEEE Standard 802.3ad, Oct. 10, 2002, v.1.10, pp. 1-21.
Kiiskilä, Marko, "Implementation of LAN Emulation of ATM in Linux," Tampereen Teknillinen Korkeakoulu, Oct. 1996, 57 pages.
IEEE Std 802.3-2002, Chapter 43.5 Marker Protocol, Part 3: Carrier Sense Multiple Access with Collision Detection (CSMA/CD) Access Method and Physical Layer Specifications, 2002, pp. 329-345.
Non-Final Office Action dated Aug. 22, 2005 from related U.S. Appl. No. 10/034,160.
Final Office Action dated Dec. 13, 2005 from related U.S. Appl. No. 10/034,160.
Non-Final Office Action dated May 31, 2006 from related U.S. Appl. No. 10/034,160.
Non-Final Office Action dated Sep. 26, 2006 from related U.S. Appl. No. 10/034,160.
Final Office Action dated Feb. 5, 2007 from related U.S. Appl. No. 10/034,160.
Non-Final Office Action dated Jul. 30, 2007 from related U.S. Appl. No. 10/034,160.
Final Office Action dated Jan. 29, 2008 from related U.S. Appl. No. 10/034,160.
Office Action dated May 22, 2006 from related U.S. Appl. No. 10/114,568.
Office Action dated Oct. 23, 2006 from related U.S. Appl. No. 10/114,568.
Office Action dated Apr. 6, 2007 from U.S. Patent Application No. 10/114,568.
Final Office Action dated Sep. 20, 2007 for U.S. Appl. No. 10/114,568.
Notice of Allowance dated Mar. 26, 2008 for U.S. Appl. No. 10/114,568.
Allowed claims for U.S. Appl. No. 10/114,568.
Office Action dated Oct. 17, 2006 from U.S. Appl. No. 10/114,394.
Final Office Action dated Apr. 4, 2007 from U.S. Appl. No. 10/114,394.
Office Action dated Aug. 22, 2007 from U.S. Appl. No. 10/114,394.
Office Action dated Feb. 6, 2008 for U.S. Appl. No: 10/114,394.
Office Action dated May 22, 2006 from U.S. Appl. No. 10/170,855.
Notice of Allowance issued Dec. 6, 2006 for U.S. Appl. No. 10/170,855.
Allowed Claims for U.S. Appl. No. 10/170,855.
Office Action dated Feb. 23, 2007 from U.S. Appl. No. 10/430,491.
Final Office Action dated Aug. 9, 2007 from U.S. Appl. No. 10/430,491.
Notice of Allowance dated Nov. 23, 2007 from U.S. Appl. no. 10/430,491.
Notice of Allowance dated Apr. 23, 2008 from U.S. Appl. No. 10/430,491.
Office Action dated Mar. 28, 2007 from U.S. Appl. No. 10/609,442.
Final Office Action dated Sep. 5, 2007 from U.S. Appl. No. 10/609,442, mailed.
Office Action dated Mar. 28, 2008 from U.S. Appl. No. 10/609,442.
Office Action dated Mar. 28, 2007 from related U.S. Appl. No. 10/791,143.
Office Action dated Sep. 10, 2007 from U.S. Appl. No. 10/974,368.
Notice of Allowance dated May 1, 2008 from U.S. Appl. No. 10/974,368.
Office Action dated May 13, 2008 from U.S. Appl. No. 10/979,886.
Office Action dated Oct. 29, 2007 from U.S. Appl. No. 11/027,252.
PCT International Search Report mailed May 23, 2003 from PCT Application No. PCT/US02/41072, 5 pages.
PCT International Search Report mailed Oct. 17, 2003 from PCT Application No. PCT/US03/09328.
PCT International Search Report mailed Jul. 15, 2003 from PCT Application No. PCT/US03/09442, 4 pages.
PCT International Search Report mailed Nov. 4, 2003 from PCT Application No. PCT/US03/18765, 3 pages.
PCT International Search Report mailed Jul. 12, 2004 from PCT Application No. PCT/US03/36452.
PCT International Search Report mailed Oct. 27, 2004 from PCT Application No. PCT/US2004/020518.
PCT International Search Report mailed Oct. 25, 2006 from PCT Application No. PCT/US05/37763.
PCT International Preliminary Report on Patentability dated Dec. 29, 2004 from PCT Application No. PCT/US05/044726.
Office Action dated Jan. 18, 2005 from EP Patent Application No. 02799279.1-1525.
Office Action dated Oct. 18, 2005 from related EP Patent Application No. 02799279.1-1525.
Office Action dated Feb. 20, 2006 from related EP Patent Application No. 02799279.1-1525.
EPO Search Report dated Feb. 10, 2006, from related EP Patent Application No. 03746053.2 -2416.
Office Action dated Oct. 1, 2007 from EP Patent Application No. 03746053.2-2416.
Office Action dated Mar. 28, 2007 from EP Patent Application No. 03746053.2—2416.
EPO Search Report dated May 19, 2005 from EP Patent Application No. 03 746062.3-1249.
Office Action dated Nov. 6, 2007 for EP Patent Application No. 03789766.7.
Office Action dated Mar. 16, 2007 from AU Patent Application No. 2002364204.
Office Action dated May 30, 2007 from AU Patent Application No. 2003226022.
Office Action dated May 23, 2007 from related AU Patent Application No. 2003226093.
Office Action dated Dec. 1, 2006 from CN Patent Application No. 02828262.0.
Office Action dated Mar. 7, 2008 from CN Patent Application No. 03807560.1.
Office Action dated Sep. 8, 2006 from CN Patent Application No. 03807600.4.
Office Action dated Oct. 19, 2007 from CN Patent Application No. 200480010826.0.

Office Action dated May 19, 2008 from JP Patent Application No. 2003-559086.

Office Action dated Jun. 2, 2008 from JP Patent Application No. 2003-582973.

Lee et al., "Label Switching in Fibre Channel Networks" U.S. Appl. No. 10/114,394, filed Apr. 1, 2002.

Office Action dated May 2, 2008 for Japanese Patent Application No. 2003-582964.

D1: Yasumori Takizawa, "Technology Scope IP Storage Disk Divided by IP Network Wide Area Ethernet Encouraging the Same," *Nikkei Communication*, Mar. 4, 200, No. 361, pp. 106-113, (Reference cited in office action issued to).

D2: Glenn Sullivan, "Building of Long Distance SAN", *UNIX Magazine*, Apr. 1, 2000, vol. 15, No. 4, pp. 133-137.

D4: Fujita et al., "SSE98-225 QoS Control Using MPLS over ATM," *Techincal Report of IEICE*, Mar. 19, 1999, vol. 98, No. 668, pp. 81-86.

Examination Report dated Jul. 14, 2008 from Australian Patent Application No. 2003296301.

Notice of Allowance for U.S. Appl. No. 10/430,491 dated Aug. 8, 2008.

Supplemental Notice of Allowance for U.S. Appl. No. 10/430,491 dated Aug. 26, 2008.

Allowed claims for U.S. Appl. No. 10/430,491.

Office Action for Chinese Patent Application No. 200580034140.X, dated Jun. 6, 2008.

U.S. Appl. No. 10/114,394, Final Office Action mailed Aug. 21, 2008.

EP Office Action dated May 30, 2006 from related EP Application No. 02799279.1-1525.

U.S Office Action mailed Aug. 18, 2009 in U.S. Appl. No. 12/202,004.

Canadian Office Action mailed Jun. 17, 2009 in Application No. 2,472,056.

Chinese Office Action mailed Aug. 28, 2009 for Application No. 03807600.4.

Canadian Office Action mailed May 11, 2009 for Application No. T8469284CA.

\* cited by examiner

METHODS AND APPARATUS FOR CHARACTERIZING A ROUTE IN A FIBRE CHANNEL FABRIC

CROSS-REFERENCE TO RELATED APPLICATIONS

This application is a continuation of U.S. patent application Ser. No. 10/170,855 filed Jun. 12, 2002 by Maurilio Cometto and Thomas Edsall, now U.S. Pat. No. 7,206,288 and titled "METHODS AND APPARATUS FOR CHARACTERIZING A ROUTE IN A FIBRE CHANNEL FABRIC," which is incorporated herein by reference in its entirety and for all purposes.

TECHNICAL FIELD

The present disclosure relates to determining route characteristics in fibre channel networks

DESCRIPTION OF RELATED ART

Techniques and mechanisms for determining route characteristics in fibre channel network are limited. Many fibre channel networks lack efficient mechanisms for performing functions such as determining connectivity to a destination, understanding the path followed by a specific data flow, evaluating the latency of each hop, tracing a route, etc.

It is therefore desirable to provide additional methods and apparatus for improving the determination of route characteristics in fibre channel networks with respect to some or all of the performance limitations noted above.

BRIEF DESCRIPTION OF THE DRAWINGS

The disclosure may best be understood by reference to the following description taken in conjunction with the accompanying drawings, which illustrate particular example embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular packet, packet header fields, and networks. However, it should be noted that the techniques of the present invention apply to a variety of packets, packet header fields, and a variety of different networks. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A fibre channel frame is received at a first fibre channel switch. The fibre channel frame includes time stamp information associated with fibre channel switches between a second fibre channel switch and the first fibre channel switch. A time-to-live (TTL) value included in the fibre channel frame is determined. The fibre channel frame is sent back to the second fibre channel switch upon determining the TTL value included in the fibre channel frame.

Example Embodiments

Figure 1:
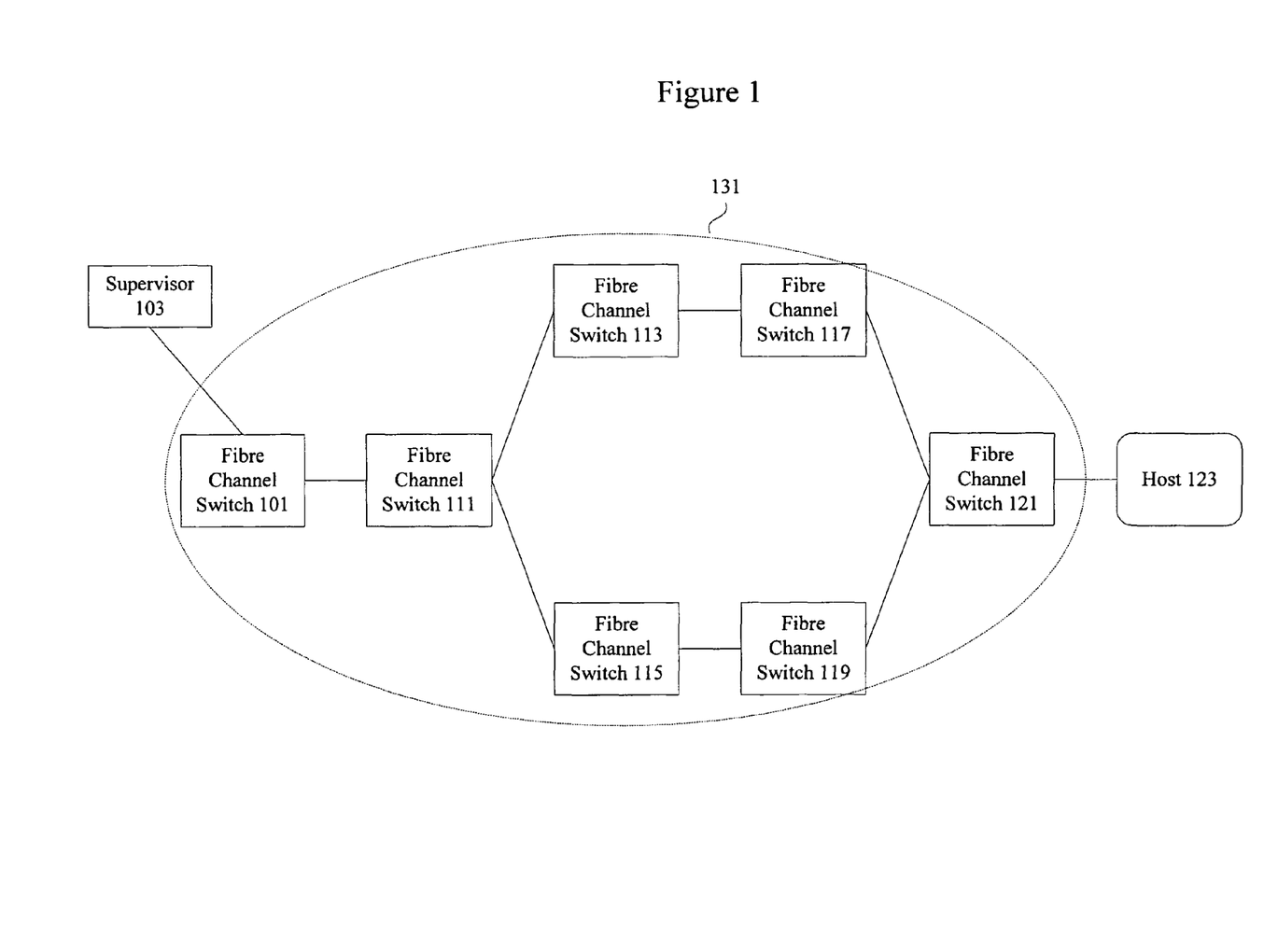
FIG. 1 is a diagrammatic representation of a network that can use the techniques of the present invention.

FIG. 1 is a diagrammatic representation of a fibre channel network that can use the techniques of the present invention. According to various embodiments, a supervisor 103 associated with a fibre channel switch 101 may wish to determine characteristics of a route from a source fibre channel switch 101, to a fibre channel switch 121 associated with a host 123, and back to the source fibre channel switch 101. A network node that sends a frame for characterizing a route back to a source upon receiving the frame from the source is referred to herein as a loopback fibre channel switch. Any logic, apparatus, or mechanism associated with a source fibre channel switch for generating messages or frames to characterize one or more routes is referred to herein as a supervisor.

It should be noted that a supervisor may be an entity distinct from a source fibre channel switch. However, it is also contemplated that the supervisor can be integrated as part of a source fibre channel switch. A host 123 associated with a loopback fibre channel switch can be a variety of entities such as disk, a server, a client, an array of disks, etc. In order to determine characteristics of a route between source fibre channel switch 101 and loopback fibre channel switch 121, implementations using mechanisms such as ping and trace route are contemplated. Using ping, one or more packets are transmitted from a source fibre channel switch 101 to a loopback fibre channel switch 121 associated with a host 123.

In one embodiment, a frame sent from source fibre channel switch 101 toward a host 123 travels through fibre channel switches 111, 113, 117, and 121. A frame returns to source fibre channel switch 101 through fibre channel switches 121, 119, 115, and 111. Mechanisms such as ping provide information on whether a host 123 associated with fibre channel switch 121 is reachable. Ping also provides information on round-trip times and average round-trip times for transmission between the source and the destination. However, mechanisms such as ping provide little information on what route was chosen, the period of time taken between hops, etc.

Other mechanisms such as trace route allow a source fibre channel switch to incrementally transmit a frame to an increasing number of hops. For example, in a first round, a frame is transmitted only for a single hop. In this example, a frame is transmitted from fibre channel switch 101 to a fibre channel switch 111. The round-trip times would be measured. In the second round, the frame would be transmitted a total of two hops from fibre channel switch 101 to fibre channel switch 111 and finally to fibre channel switch 113. The round-trip time would again be measured. Mechanisms such as trace route allow the determination of round-trip times between a source and intermediate nodes to a destination. Nodes in a route between a source and a destination are referred to herein as intermediate nodes. Trace route provides more information than mechanisms such as ping.

Trace route provides information on whether a destination node is reachable and also provides information on round-trip times between a source fibre channel switch and intermediate hops. However, trace route still does not provide information detailing the break-up of the round-trip time. For example, trace route does not detail the return path characteristics. The methods and apparatus of the present invention provide techniques for efficiently implementing techniques such as ping and trace route in a fibre channel network using mechanisms that provide even more information about the characteristics of a route.

In one example, the techniques of the present invention provide information on how much time it takes for a frame to travel from a switch 101, through a switch 111, to a switch 113, and back through a switch 111, and finally to a switch 101. According to various embodiments, the latency for each hop in a route between a source and the destination is measured for both upstream and downstream transmission. Transmission from a source to a destination is referred to herein as downstream transmission while transmission from a destination to a source is referred to herein as upstream transmission. Mechanisms and logic for determining timing characteristics associated with a route are referred to herein as remote domain loopback (RDL). A frame transmitted from a source to a destination and back to a source used to implement RDL is referred to herein as a loopback frame. A transmission information entry in a frame that indicates that the frame is being used as a loopback frame is referred to herein as a loopback field or a loopback indicator.

Frames transmitted for determining route characteristics are referred to herein as RDL frames. According to various embodiments, a path followed for a specific data flow in a fibre channel fabric can be characterized and a route followed by data traffic can be understood. A determination of connectivity in the fabric toward a specific destination node can also be determined.

According to various embodiments, fibre channel switches in the fibre channel fabric 131 can be synchronized. A variety of global synchronization protocols can be used. In one example, the Network Time Protocol (NTP) is run on the fibre channel fabric. NTP is described in RFC 1059 titled Network Time Protocol, the entirety of which is incorporated by reference for all purposes. If a supervisor 103 associated with a fibre channel switch 101 wishes to determine characteristics of a route to and from a fibre channel switch 121 associated with a host 123, RDL frames can be transmitted toward the loopback fibre channel switch 121 associated with host 123. At each hop, time stamp information is added to the frame to allow characterization of the route.

In one example, a frame may be transmitted from fibre channel switch 101 at time 00.00 seconds exactly. It may take 0.01 seconds to reach fibre channel switch 111, at which time fibre channel switch 111 adds time stamp information including 00.01 seconds. Each intermediate hop in the route toward the destination also inserts time stamp information into the frame. Information for characterizing latency between hops in a route between a source and a loopback fibre channel switch is referred to herein as time stamp information. According to various embodiments, time stamp information includes a port number, a switch identifier, and a time stamp. When the RDL frame reaches a loopback fibre channel switch 121, the fibre channel switch 121 does not forward the RDL frame to host 123 and instead sends it back towards the source fibre channel switch 101.

According to various embodiments, fibre channel switch 121 recognizes that a host 123 is the end node. In another example, fibre channel switch 121 may send a frame back towards the source fibre channel switch 101 if the fibre channel switch 121 recognizes that the next hop toward a destination is an entity that does not support RDL frames. A network entity that is not operable to add time stamp information to a loopback frame does not support RDL according to various embodiments. A fibre channel switch 121 may loop back the frame along an upstream route that is different from the downstream route. Time stamp information at each hop along an upstream route is added to the RDL frame. When a fibre channel switch 101 receives the frame looped back from the loopback fibre channel switch, a fibre channel switch 101 provides time stamp information to a supervisor 103 to allow characterization of the route.

According to other embodiments, fibre channel switches in the fibre channel fabric 131 are not synchronized. Nonetheless, valuable information can be acquired from time stamp information provided at each hop. In one example, the total round-trip time for asymmetric route could be obtained. Furthermore, changes in latency for a particular hop could be determined even if the different switches in a fibre channel fabric had widely different times.

Figure 2:
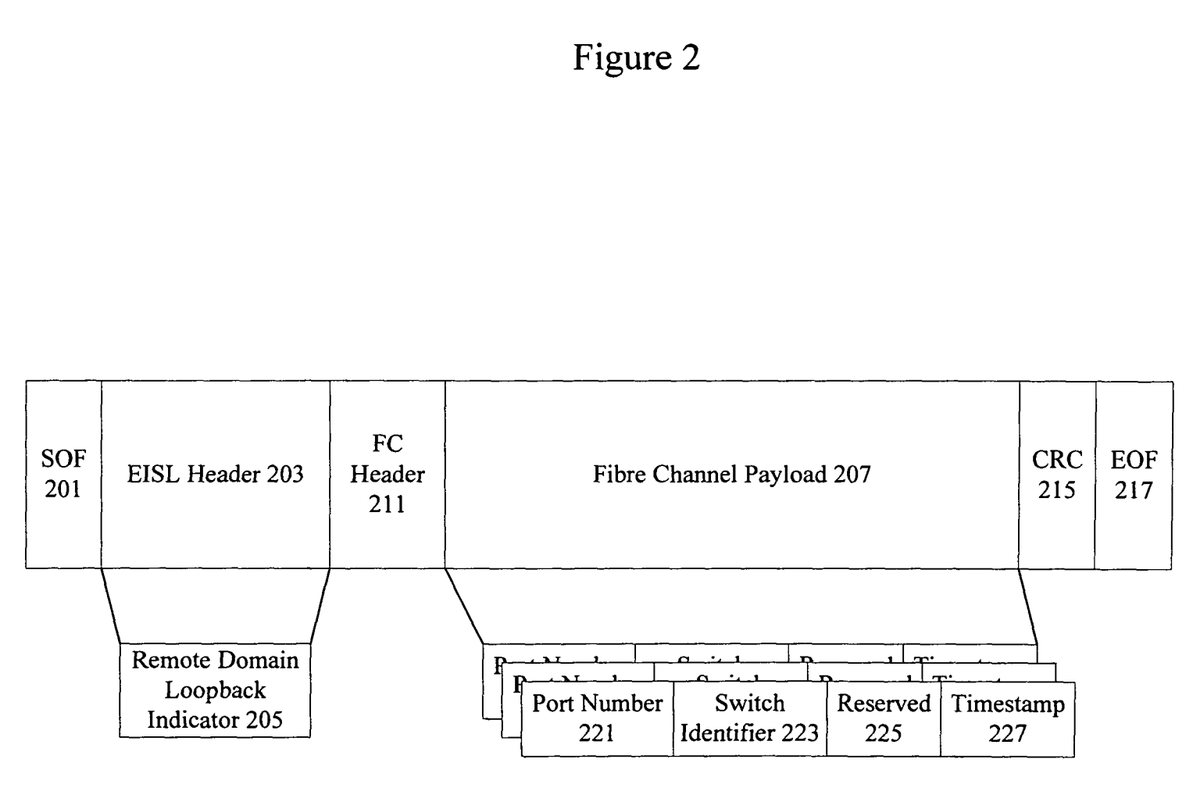
FIG. 2 is a diagrammatic representation of a loopback frame.

FIG. 2 is a diagrammatic representation of a frame that can be used to implement RDL. According to various embodiments, a loopback indicator 205 is located in the Extended Inter-switch Links (EISL) header 203. In one example, the loopback indicator is a vendor unique code indicating that the frame is a loopback frame. EISL is described in application Ser. No. 10/034,160 titled Methods And Apparatus For Encapsulating A Frame For Transmission In A Storage Area Network by Thomas J. Edsall, Dinesh G. Dutt, and Silvano Gai. It should be noted that an RDL indicator can also be located in other fields such as in FC Header 211.

According to various embodiments, the payload 207 of the fibre channel frame contains time stamp information inserted at each hop. In one example, time stamp information is inserted at the beginning of the payload by shifting the existing time stamp information by a predetermined number of bytes. The time stamp information for characterizing a route can include entries such as the port number 221 associated with the input port of a switch inserting the time stamp information, a field identifying the switch 223 such as a world wide name (WWN), a time stamp 227, and a reserved field for any additional information such as error codes that a switch wishes to insert.

According to specific embodiments, the fibre channel payload 207 includes a stack of 8-byte time stamp information entries. The time stamp information entries are used by a supervisor associated with a fibre channel switch for determining route characteristics such as the latencies between switches in a route.

It should be noted that the EISL header can include other fields such as a time-to-live (TTL) field. The time-to-live field is decremented at each hop like the time-to-live field in a conventional IP packet.

Figure 3:
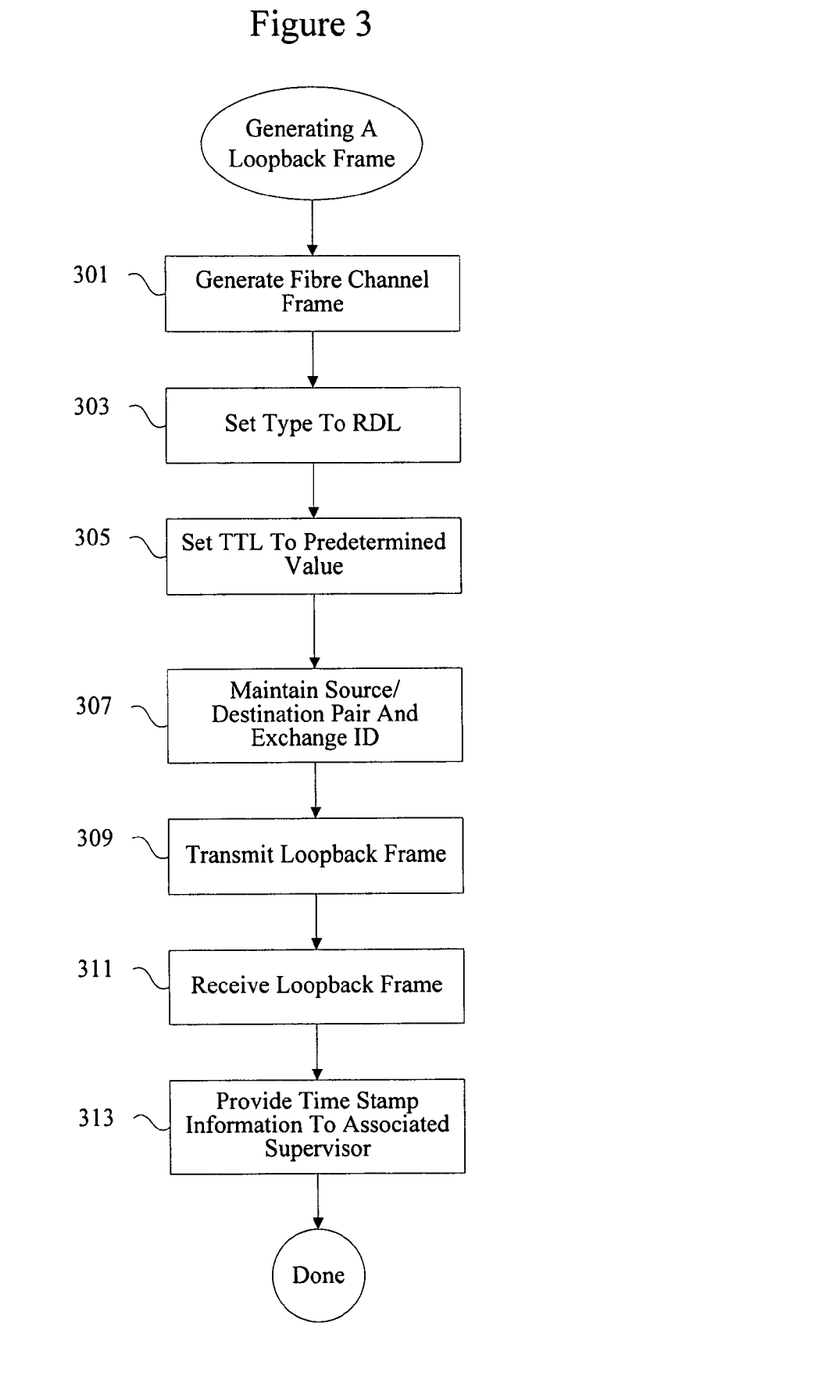
FIG. 3 is a flow process diagram showing operations at a source fibre channel switch.

FIG. 3 is a process flow diagram showing one example of generating a loopback frame at a source fibre channel switch associated with a supervisor. According to various embodiments, a fibre channel frame is generated at 301. In one embodiment, the fibre channel frames generated is a conventional fibre channel frame valid for transmission in the fibre channel fabric. At 303, a loopback field such as an RDL indicator in the fibre channel frame is set. Setting the loopback field can entail setting an RDL indicator into an EISL header associated with the fibre channel frame. At 305, the TTL field is set to a predetermined value. In one embodiment, the TTL can be set to the same values used for setting other fibre channel frames that do not include a loopback indicator. In one example, the TTL field a set to the value of 64.

Setting the TTL field to a high-value increases the likelihood that the fibre channel frame will reach its destination. However, setting too high a value may cause a frame that should be dropped to remain too long in a fibre channel fabric. At 307, the destination switch identifier is maintained. In one embodiment, the exchange identifier is also maintained at the source fibre channel switch to allow the source fibre channel switch to determine whether a loopback frame transmitted toward a destination has been successfully looped back from the destination. At 309, the loopback frame is transmitted toward the destination. At 311, the loopback frame initially transmitted toward the destination is received after it is successfully looped back from the destination. According to various embodiments, the loopback frame received is different from the loopback frame transmitted.

In one embodiment, the source and destination address fields in the loopback frame transmitted by a source are swapped when the loopback frame is received by the source. Other fields and indicators such as originator and destination bits may also be changed. At 311, the source fibre channel switch then extracts the time stamp information inserted at the various hops in the route from the source fibre channel switch, to the loopback fibre channel switch, and back to the source fibre channel switch. The time stamp information is provided to an associated supervisor at 313.

Figure 4:
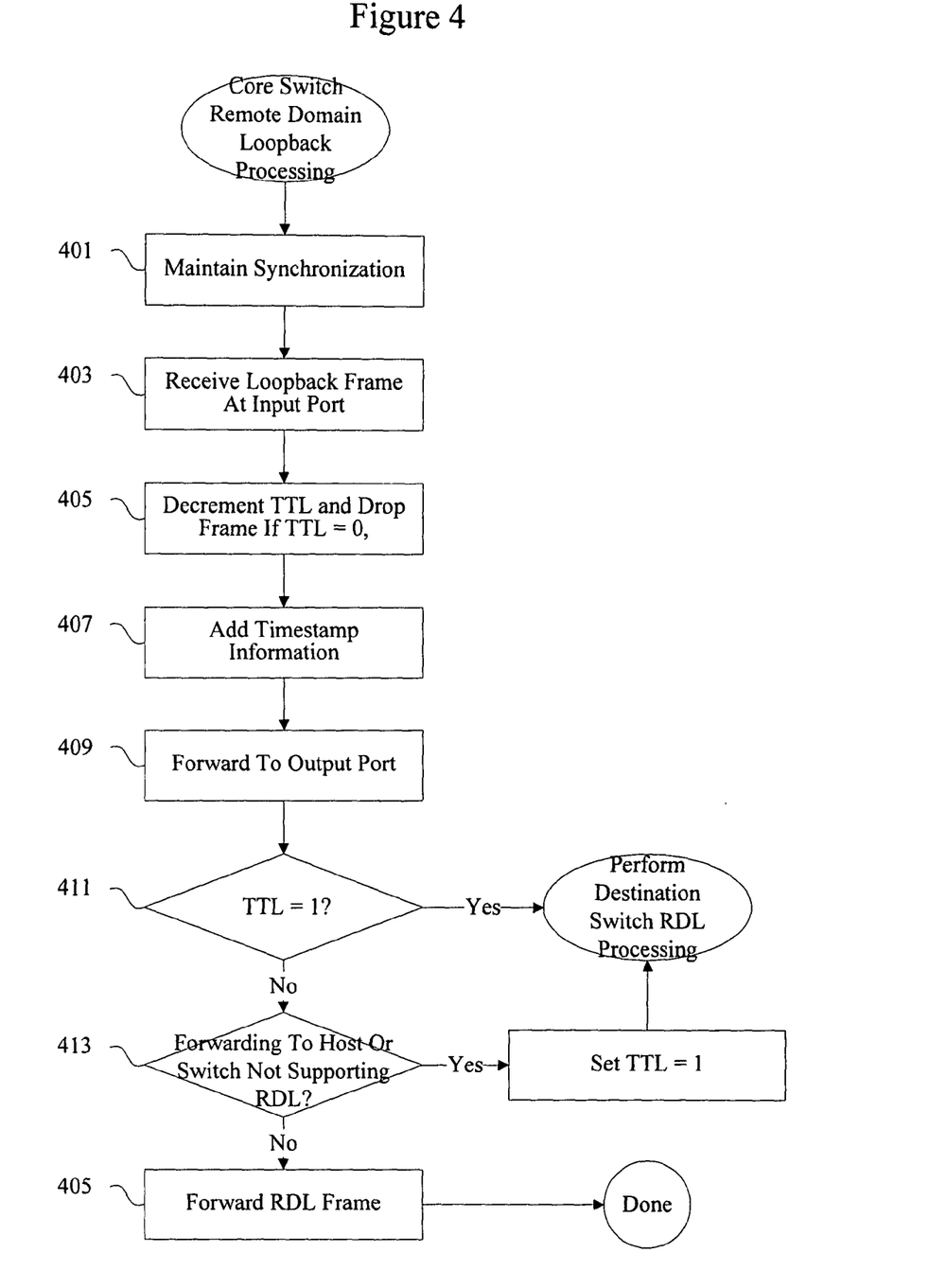
FIG. 4 is a flow process diagram showing operations at a core fibre channel switch.

FIG. 4 is a process flow diagram showing one example of core fibre channel switch RDL processing. Any fibre channel switch that a source fibre channel switch transmits to is referred to herein as a core fibre channel switch. According to various embodiments a core fibre channel switch can be an intermediate switch between a source and a destination. It should also be noted that a core fibre channel switch may determine that it is the loopback fibre channel switch upon examining a loopback frame.

At 401, synchronization is maintained with other fibre channel switches in the fibre channel fabric. In typical implementations, synchronization is maintained outside of the steps of FIG. 4. Synchronization can be maintained using protocols such as NTP where switches in the fibre channel fabric acquire a uniform time from one or more particular fibre channel switches. At 403, the loopback frame is received at an input port. It should be noted that a fibre channel switch can have one or more input ports. In one embodiment, the port number associated with the input port is maintained. At the input port, conventional fibre channel frame processing can also be performed. Conventional fiber channel frame processing can include dropping the frame if a time-to-live field is equal to 0 at 405. Otherwise, the time-to-live field is decremented.

At 407, time stamp information is added to the frame. Adding time stamp information can entail shifting bytes in the frame, changing header information, as well as adding information such as an input port number, the current time, and a field uniquely identifying the switch. It is contemplated that in some embodiments, certain frames along the route may not insert time stamp information. Nonetheless the techniques of the present invention provide mechanisms for determining characteristics for transmission between many hops in a route between a source and the destination. According to various embodiments, the process steps at a core fibre channel switch can be performed by a media access control (MAC) block used for forwarding fibre channel frames. An output port is then selected using mechanisms such as a forwarding table. The loopback frame is forwarded to the selected output port at 409. At 411, it is determined if the time-to-live field is equal to one.

If the time-to-live field is equal to one, the core fibre channel switch becomes a loopback fibre channel switch for loopback processing. Fibre channel switch loopback processing will be described in FIG. 5. If the TTL is not equal to one, it is determined if the frame is being forwarded to either a switch that does not support RDL or to a host. According to various embodiments, hosts such as disks and disk arrays and switches that do not support RDL are not able to handle loopback frames. A switch about to forward a loopback frame to a host or a switch that does not support RDL instead sets the TTL to one at 417 and performs loopback switch RDL processing. Otherwise the frame is forwarded at 415.

Figure 5:
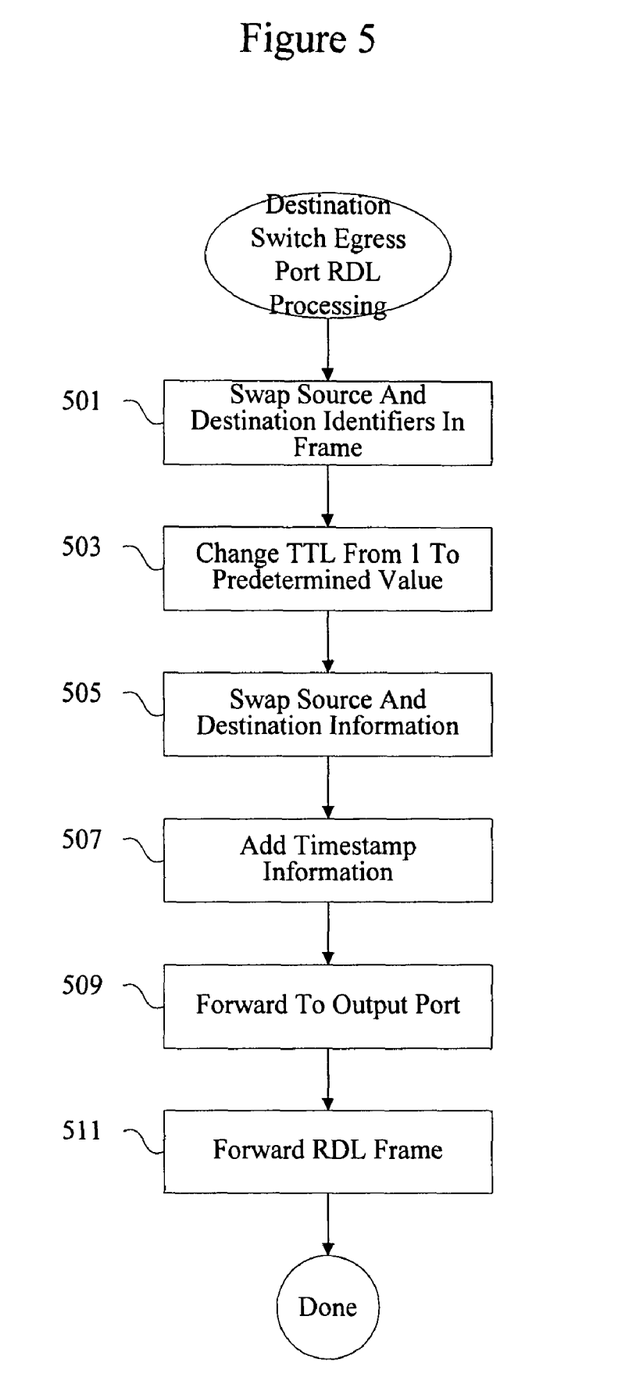
FIG. 5 is a flow process diagram showing operations at a core fibre channel switch determined to be a loopback fibre channel switch.

FIG. 5 is a process flow diagram showing loopback switch output port RDL processing. As noted above, a core fibre channel switch becomes a loopback fibre channel switch when the TTL is determined to be equal to one at the output port or the frame is about to be forwarded to a host or a switch that does not support RDL. According to various embodiments, the loopback switch is where the RDL frame is looped back to the source fibre channel switch. It should be noted that a loopback switch may also be a destination switch in some examples, as the switch may be associated with a host corresponding to the destination of the fibre channel frame.

At 501, source and destination identifiers in the frame are swapped at the output port of the loopback fibre channel switch. At 503, the TTL is changed from one to a predetermined value large enough to allow the frame to reach the source fibre channel switch from the loopback fibre channel switch. At 505, other source and destination information is swapped. In one example, originator and destination bits are set accordingly at the output port of the loopback fibre channel switch. According to various embodiments, the output port number becomes an input port performing functions similar to that of a core fibre channel switch input port. At 507, time stamp information is added to the RDL frame. At 509, the frame is forwarded to an output port for transmitting the frame towards a source. The RDL frame is forwarded at 511.

Figure 6:
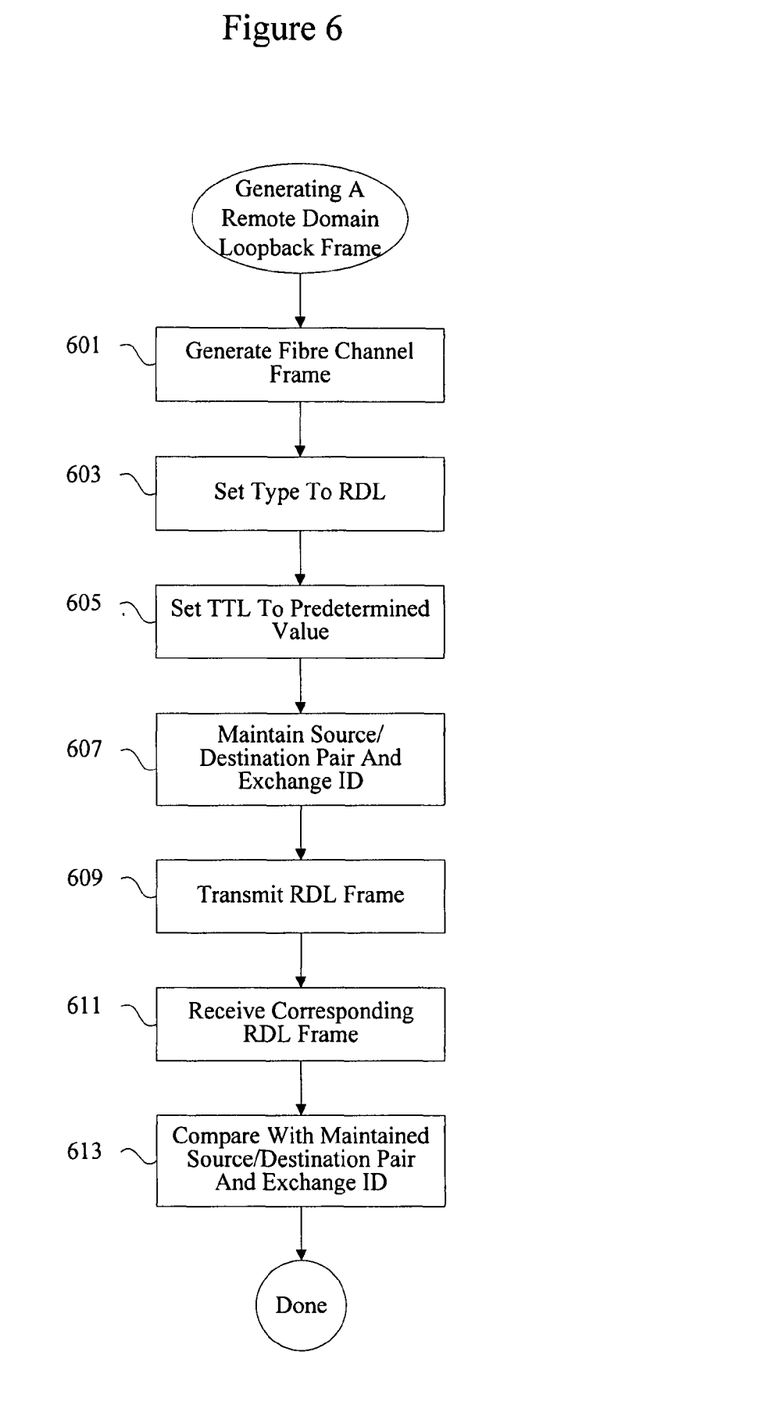
FIG. 6 is a flow process diagram showing operations for applying remote domain loopback for determining connectivity.

FIG. 6 is a process flow diagram showing one example of the RDL frame generation for determining connectivity to a destination. A supervisor may wish to determine whether a destination is reachable from a source fibre channel switch. At 601, a fibre channel frame is generated. According to various embodiments, the frame generated is a valid fibre channel frame. At 603, a loopback indicator is set. At 605, a time-to-live field is set to a predetermined value to allow the frame to travel to a loopback fibre channel switch. The TTL value may be based on the size of the fibre channel fabric as well as the maximum length of a frame. At 607, identifiers associated with the source and destination pair and the exchange identifier are maintained.

It should be noted that the process steps described in the various process flow diagrams do not necessarily have to be performed in any particular order. For example, source and destination pair and exchange identifiers can be maintained before a loopback indicator is set or a time-to-live field is set. Variations are also possible. In one example, an exchange identifier and a source identifier are not maintained. A destination identifier is maintained and some other sequence number is maintained instead.

According to various embodiments, the source, destination, and exchange identifiers are maintained. At 609, the loopback frame is transmitted toward the destination. The frame is then processed by various core fibre channel switches and sent back toward the source when the frame reaches a loopback fibre channel switch. At 611, the looped back frame is received by the source fibre channel switch. In one embodiment, the loopback frame contains time stamp information associated with each of the hops the frame traversed in its route to and from the loopback fibre channel switch. Header information in the looped back frame is compared with source and destination identifier and exchange identifier information maintained at 607. If the information corresponds, time stamp information is analyzed to determine if there is connectivity to the loopback fibre channel switch at 613.

If time stamp information is available in the frame, the time stamp information can be checked to determine what routes the frame traversed during downstream as well as upstream transmission. As noted above, fields indicating what fibre channel switches the frame has traversed are included in time stamp information in the loopback frame. If no looped back RDL frame corresponding to the maintained source, destination, and exchange identifier information is received, it can be inferred that there may be no connectivity to the destination. Similarly, if time stamp information indicates that the frame was looped back before reaching a destination, it can be determined that no connectivity exists. In one embodiment, a TTL value can be increased and another attempt can be made to reach the destination where a TTL field may have expired before the frame had a chance to reach its destination.

Figure 7:
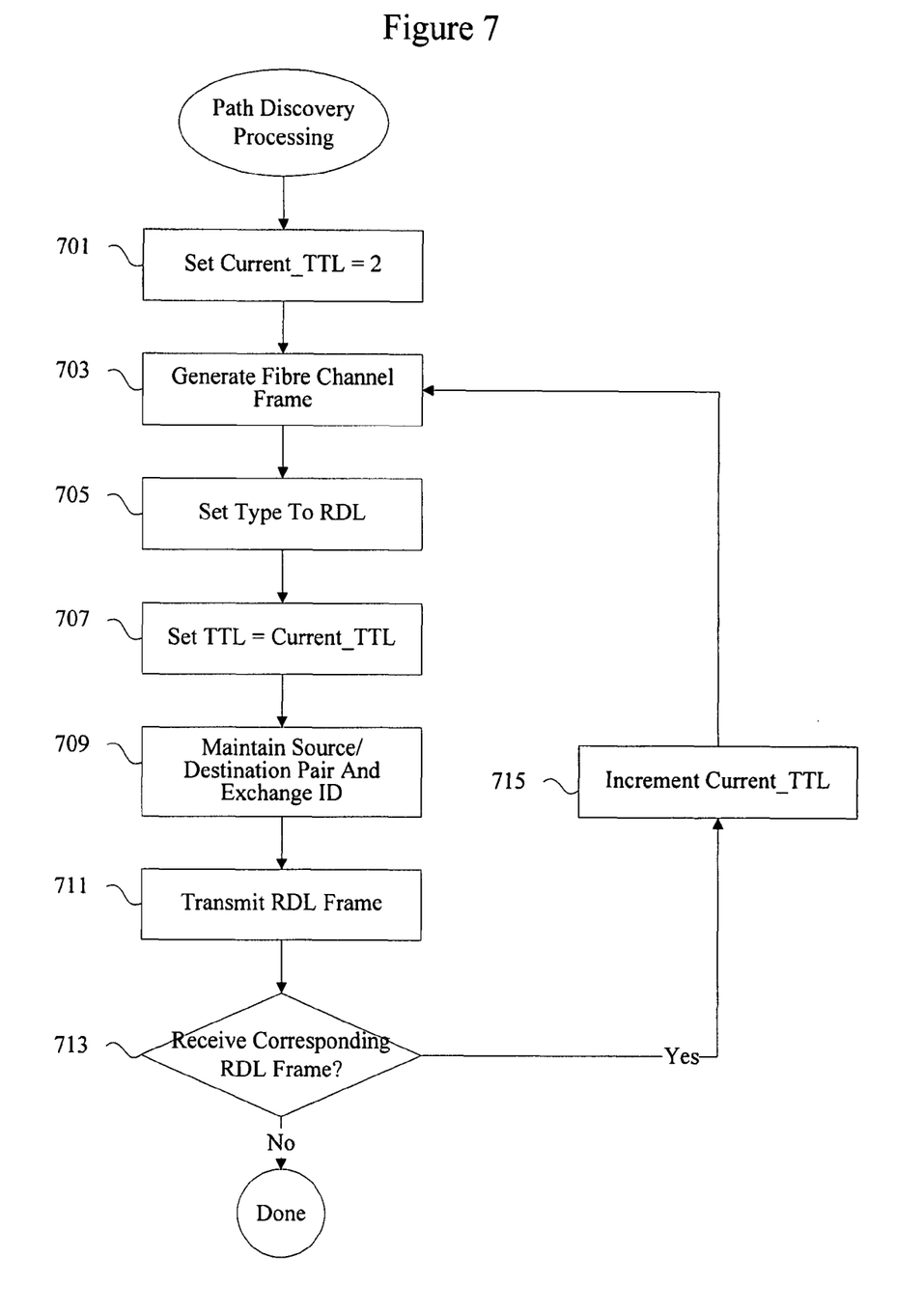
FIG. 7 is a flow process diagram showing operations for applying remote domain loopback for path discovery.

FIG. 7 is a process flow diagram showing one example of path discovery processing. According to various embodiments, the supervisor may wish to determine and how far along a path toward a destination a frame can be transmitted. One technique for determining a path is by setting the time-to-live field to specific values. At 701, a variable such as a $current_{13}$ TTL variable is set to two. Setting a current_TTL variable to two allows the frame to be transmitted to a next hop. As noted above, when a TTL variable is one, a fibre channel switch becomes a loopback fibre channel switch. A fibre channel frame is generated at 703. Loopback indicator is set at 705.

The time-to-live field is set to equal the variable current_TTL at 707. At 709, identifiers associated with the source, destination, and exchange are maintained. The loopback frame is transmitted at 711. It is determined at 713 whether the loopback frame corresponding to the maintained source, destination, and exchange identifiers is received at 713. According to various embodiments, the data included in received frames is analyzed. If a loopback frame corresponding to the maintained information is received at 713, the current time-to-live field is incremented at 715. The fibre channel frame is then generated at 703, the type of the fibre channel frame is set to loopback at 705, and the TTL is set to the new current_TTL which is now 3. The frame will now be transmitted an additional hop. By incrementing the TTL, the fibre channel frame is transmitted to more nodes in the network. A route from a source to a destination can also be gradually determined. If a loop back frame at 713 is not received, it is possible that a fibre channel switch in the route between the source and the destination fibre channel switch may be dropping frames. Using path discovery as described above can also be useful for determining round trip times even if switches in the fibre channel fabric are not synchronized.

As described above, providing time stamp information may be performed in a variety of network devices. According to various embodiments, the switch includes a processor, network interfaces, and memory. A variety of ports, Media Access Control (MAC) blocks, and buffers can also be provided as will be appreciated by one of skill in the art.

Figure 8:
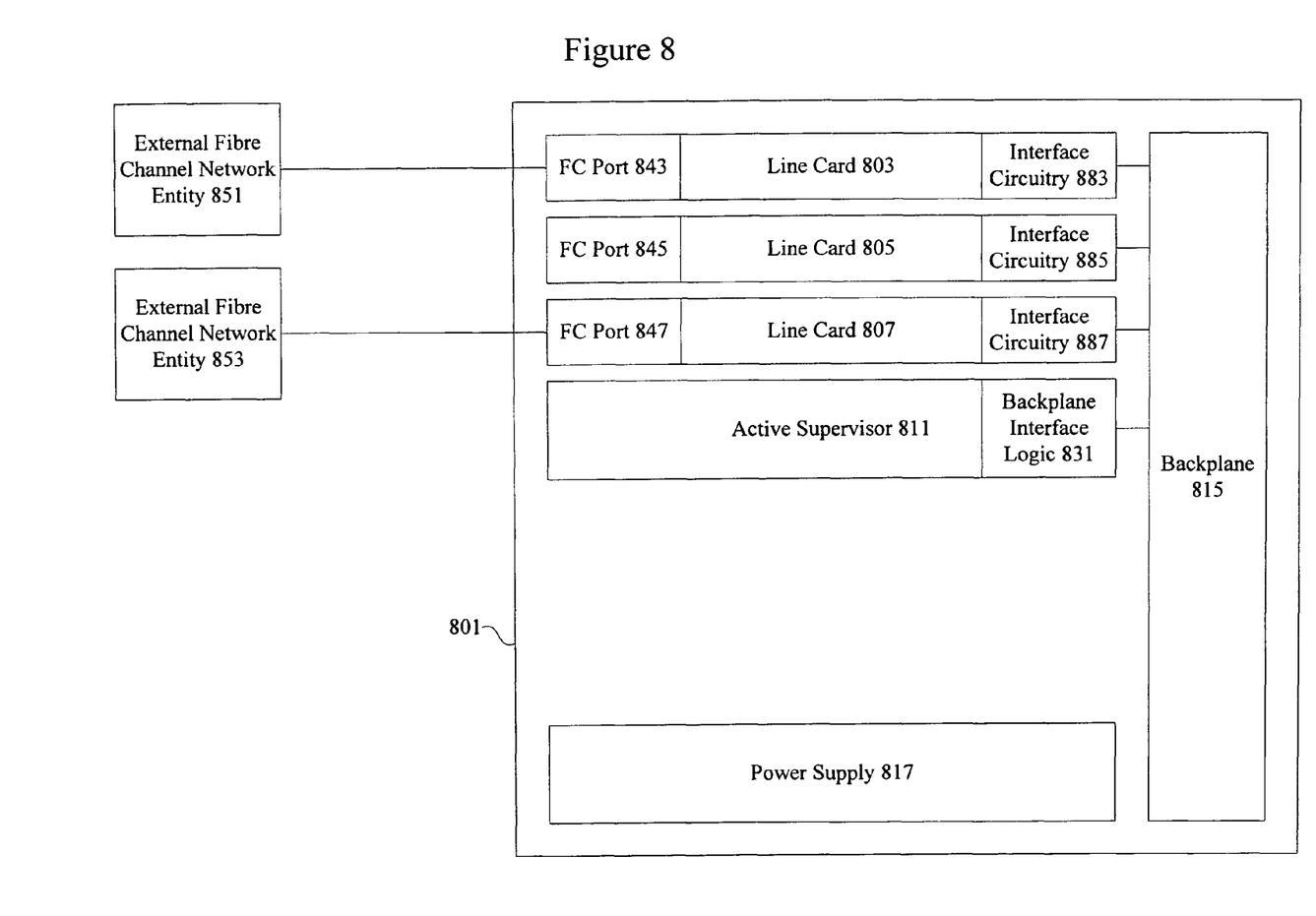
FIG. 8 is a diagrammatic representation of a fibre channel switch.

FIG. 8 is a diagrammatic representation of one example of a fibre channel switch that can be used to implement techniques of the present invention. Although one particular configuration will be described, it should be noted that a wide variety of switch and router configurations are available. The fibre channel switch 801 may include one or more supervisors 811. According to various embodiments, the supervisor 811 has its own processor, memory, and storage resources.

Line cards 803, 805, and 807 can communicate with an active supervisor 811 through interface circuitry 883, 885, and 887 and the backplane 815. According to various embodiments, each line card includes a plurality of ports that can act as either input ports or output ports for communication with external fibre channel network entities 851 and 853. The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, and utility applications.

According to one embodiment, the routing application is configured to provide message forwarding and routing functionality. A utility application can be configured to provide system clock and time stamp functionality. A domain manager application 325 can be used to assign domains in the fibre channel storage area network. Various supervisor applications may also be configured to provide functionality such as quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A method, comprising:
receiving a fibre channel frame at a first fibre channel switch, the fibre channel frame including time stamp information associated with a plurality of fibre channel switches between a second fibre channel switch and the first fibre channel switch;
determining a time-to-live (TTL) value included in the fibre channel frame;
sending the fibre channel frame back to the second fibre channel switch upon determining the TTL value included in the fibre channel frame.

2. The method of claim 1, wherein the fibre channel frame is sent back to the second fibre channel switch when the TTL value is determined to be 1.

3. The method of claim 1, wherein the fibre channel frame includes a loop back field indicating that the fibre channel frame should be looped back when the TTL value reaches 1.

4. The method of claim 1, wherein the fiber channel frame traverses a first route to reach the first fibre channel switch.

5. The method of claim 4, wherein the fibre channel frame traverses a second route to return to the second fibre channel switch, wherein the second route is different from the first route.

6. The method of claim 5, wherein the fibre channel frame is time stamped by a plurality of first route fibre channel switches and a plurality of second route fibre channel switches.

7. The method of claim 6, wherein the fibre channel frame is further time stamped by the first fibre channel switch.

8. The method of claim 1, wherein the first fibre channel switch and the second fibre channel switch are synchronized.

9. The method of claim 1, wherein the first fibre channel switch is a core fibre channel switch and the second fibre channel switch is a source fibre channel switch.

10. The method of claim 1, wherein the source fibre channel switch and the plurality of fibre channel switches are synchronized.

11. An apparatus, comprising:
an interface operable to receive a fibre channel frame, the fibre channel frame including time stamp information associated with a plurality of fibre channel switches between the apparatus and a source fibre channel switch;
a processor operable to determine a time-to-live (TTL) value included in the fibre channel frame;
wherein the interface is further operable to send the fibre channel frame back to the source fibre channel switch upon determining the TTL value included in the fibre channel frame.

12. The apparatus of claim 11, wherein the fibre channel frame is sent back to the source fibre channel switch when the TTL value is determined to be 1.

13. The apparatus of claim 11, wherein the fibre channel frame includes a loop back field indicating that the fibre channel frame should be looped back when the TTL value reaches 1.

14. The apparatus of claim 11, wherein the fiber channel frame traverses a first route to reach the source fibre channel switch.

15. The apparatus of claim 14, wherein the fibre channel frame traverses a second route to return to the source fibre channel switch, wherein the second route is different from the first route.

16. The apparatus of claim 15, wherein the fibre channel frame is time stamped by a plurality of first route fibre channel switches and a plurality of second route fibre channel switches.

17. The apparatus of claim 16, wherein the fibre channel frame is further time stamped by the source fibre channel switch.

18. A system, comprising:
means for receiving a fibre channel frame at a first fibre channel switch, the fibre channel frame including time stamp information associated with a plurality of fibre channel switches between a second fibre channel switch and the first fibre channel switch;
means for determining a time-to-live (TTL) value included in the fibre channel frame;
means for sending the fibre channel frame back to the second fibre channel switch upon determining the TTL value included in the fibre channel frame.

19. The system of claim 18, wherein the fibre channel frame is sent back to the second fibre channel switch when the TTL value is determined to be 1.

20. The system of claim 18, wherein the TTL value is incremented before sending the fibre channel frame back to the second fibre channel switch.

* * * * *